Nov. 15, 1938.    H. M. GUINOT    2,136,613
PROCESS FOR THE MANUFACTURE OF ESTERS, ESPECIALLY OF ETHYL ACETATE
Filed Feb. 19, 1936
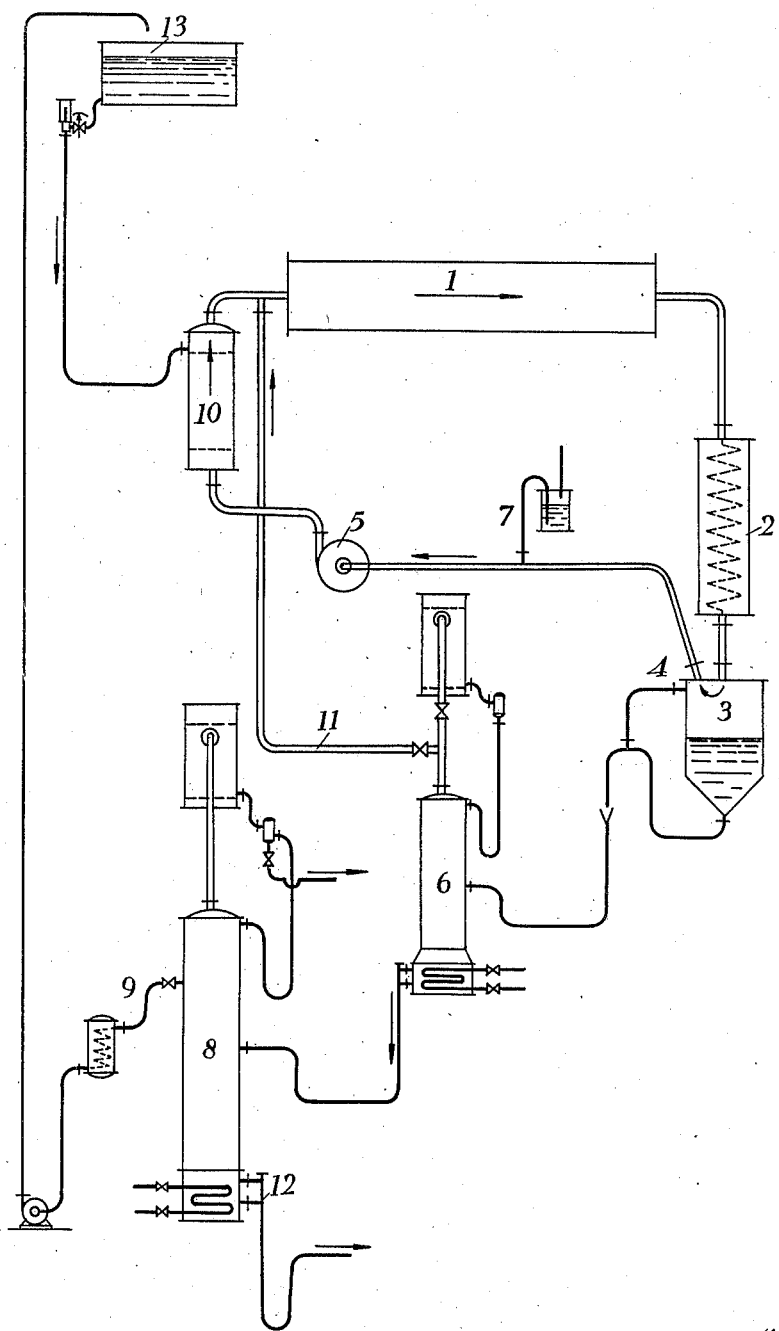
INVENTOR
H. M. Guinot
BY
C. F. Wenderoth
ATTORNEY Patented Nov. 15, 1938

2,136,613

UNITED STATES PATENT OFFICE 2,136,613

PROCESS FOR THE MANUFACTURE OF ESTERS, ESPECIALLY OF ETHYL ACETATE

Henri Martin Guinot, Niort, Deux-Sevres, France, assignor to Usines de Melle, Melle, France, a corporation of France Application February 19, 1936, Serial No. 64,786
In France February 27, 1935

12 Claims. (Cl. 260—495)

This invention relates to the manufacture of esters, particularly of ethyl acetate.

It is already known to pass alcohol over dehydrogenation catalysts heated at temperatures between 250° and 500° C. and kept under a pressure greater than 10 atmospheres with a view to obtaining its partial conversion into various products such as ethyl acetate, butyl alcohol, acetaldehyde, acetone, crotonyl alcohol, butyl and crotonic acetates and various other higher alcohols or corresponding esters.

It is also known that if a substantially equimolecular mixture of alcohol and hydrogen is passed over certain catalysts consisting of magnesium oxide mixed with other oxides and heated at between 220° and 350° C. under atmospheric pressure, there is a formation of higher alcohols, more especially of butyl alcohol and hexyl alcohols, in addition to small quantities of acetaldehyde, butyraldehyde and crotonaldehyde.

The present invention has for its chief object a process which enables the conversion of alcohol almost exclusively into ethyl acetate to be effected. It is based upon the following observations:—

When alcohol vapours are passed, without special precautions, over a dehydrogenation catalyst which has been heated to a temperature between 200 and 260° C., there is observed simply a brisk evolution of hydrogen with the production of acetaldehyde. However, if, instead of allowing the gases formed in the reaction to escape at the exit from the furnace, they are, after partial condensation, taken back to the furnace, with the aid of some mechanical means, and forced to pass rapidly therethrough, it being arranged that the supply of gases rich in hydrogen that are thus brought back over the catalyst is great in relation to the alcohol supplied, the surprising fact is observed that a part of the alcohol is converted into ethyl acetate.

There is at the same time the production of a small quantity of acetaldehyde. Now, it has also been found that the acetaldehyde itself can be converted, in turn, into ethyl acetate in the catalyst furnace under the conditions in which the principal reaction is effected.

Everything takes place as if the two following reactions were produced:—

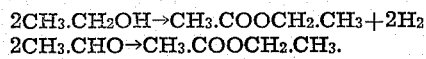

Under these conditions, it is therefore recommended to separate from the reaction product the acetaldehyde and the alcohol which have not reacted and to cause them to re-enter the circuit with a view to their subsequent and total conversion into ethyl acetate.

The process forming the subject matter of the invention, which is based on these observations, therefore, consists essentially in passing the alcohol that is to be converted over a dehydrogenation catalyst that is heated at between 200° and 260° C., subjecting the products rich in hydrogen that result from the catalytic conversion to a partial condensation and passing back continuously over the catalyst, at the same time as the alcohol supplied, the gases and vapours that have escaped condensation; preferably the inflow of alcohol and the return of the gases and vapours are regulated in such a manner that the supply of the latter is great in relation to the supply of alcohol. In addition the acetaldehyde and the alcohol that have not reacted are recovered in the condensed products and passed back over the catalyst.

It is to be noted that if a dilute alcohol is employed for effecting the reaction, the quantity of ester formed decreases rapidly whilst, at the same time, the production of a large proportion of acetic acid is observed. It is therefore necessary to work with an anhydrous alcohol for the purpose of obtaining the maximum rate of conversion into ester at the same time as a high yield and of avoiding the production of fatty acids having the same number of carbon atoms as the alcohol treated.

There may be used as catalysts all the reduced metals that have a dehydrogenating action, provided that they produce as little destruction as possible of the alcohol with formation of carbon monoxide, carbonic acid and hydrocarbons. It is nearly always advantageous to add a small quantity of promoter oxides, among which the most interesting are the oxides of titanium, thorium and uranium.

The process is applicable not only to ordinary alcohol but also to other primary aliphatic alcohols, the latter giving rise to corresponding esters possessing double the number of carbon atoms.

The following description with reference to the accompanying drawing, which is given by way of example and represents, in its single figure, the diagram of an apparatus that is suitable for carrying out the invention, will enable one to understand well how the latter may be carried into effect:—

Anhydrous ethyl alcohol is passed, at the rate of 100 kilogrammes per hour, into a vaporizer 10 connected to a furnace 1 that contains a catalyst consisting of reduced copper carried on infusorial earth and 10 per cent. of uranium oxide as promoter. The catalyst being heated at 220° C., there is first of all observed a brisk evolution of hydrogen with the production of pure acetaldehyde which is partially condensed in a condenser 2 at the same time as the unconverted alcohol, the whole of the condensate being collected in a vessel 3.

If, at this moment, the gases are taken off through a pipe 4 by means of a pump 5 and passed back over the catalyst along with the vapours of the alcohol the rate of supply of which remains unchanged, it is observed that the liquids condensed in the vessel 3 contain, after passage through the catalyst furnace, a large quantity of ethyl acetate whilst, at the same time, the percentage of acetaldehyde is only slight. The acetaldehyde can be separated by distillation in a column 6 and brought back continuously through a pipe 11 with the alcohol supplied. From that moment onwards the apparatus works normally.

It is arranged that the flow of gases that are rich in hydrogen and are brought back over the catalyst should be high. For example, the action of the fan may be regulated to ensure a supply of 250 cubic metres of gases per hour when the total amount of alcohol supplied is 100 kilogrammes.

There escapes from the apparatus at 7, through a valve of any suitable type, hydrogen in a quantity corresponding to the ethyl acetate that is formed. From the gases leaving the catalyst furnace, there is condensed in the vessel 3 an alcoholic liquid having approximately the following composition:—

|  | Per cent. |
|---|---|
| Ethyl acetate | 17 |
| Acetaldehyde | 1.5 |
| Acetic acid | 0.15 |
| Butyl alcohol and higher alcohols | 0.7 |
| Water | traces |
| Alcohol about | 80.0 |
| Various other substances to make up | 100 |

The yield of ethyl acetate, in relation to the alcohol that has disappeared in the reaction, is therefore of the order of 95 per cent. This ethyl acetate is separated at the top of a distilling column 8, mixed with small quantities of alcohol and water, this mixture having a composition that is intermediate between that of the ternary azeotropic mixture boiling at 70.3° C. and that of the binary ester-alcohol azeotropic mixture boiling at 71.8° C. From this crude product, pure anhydrous ethyl acetate can be extracted by known methods.

The unconverted alcohol is withdrawn laterally from the distilling column 8 through the pipe 9 and is brought back into the tank 13 with the supply of alcohol. The heavy products are withdrawn at 12 at the base of the column.

Finally, it is pointed out that the whole or a part of the process can be carried out under a pressure that differs from the atmospheric pressure, if this measure is found to be convenient or advantageous.

What I claim is:—

1. Process for the conversion of an aliphatic primary alcohol into an ester containing double the number of carbon atoms, comprising essentially passing the alcohol to be converted, in a practically anhydrous condition, over a dehydrogenation catalyst maintained at a temperature between 200° and 260° C., removing substantially all the ester formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction, and regulating the rate of admission of the returned gases so as to be great relatively to the fresh alcohol.

2. Process for the conversion of an aliphatic primary alcohol into an ester containing double the number of carbon atoms, comprising essentially passing the alcohol, in a substantially anhydrous state, over a dehydrogenation catalyst maintained at a temperature between 200° and 260° C., removing substantially all the ester formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction.

3. Process for the conversion of ethyl alcohol into ethyl acetate, comprising essentially passing the alcohol to be converted, in a practically anhydrous condition, over a dehydrogenation catalyst maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction, and regulating the rate of admission of the returned gases so as to be great relatively to the fresh alcohol.

4. Process for the conversion of ethyl alcohol into ethyl acetate, comprising essentially passing the alcohol, in a substantially anhydrous state, over a dehydrogenation catalyst maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction.

5. Process for the conversion of an aliphatic primary alcohol into an ester containing double the number of carbon atoms, comprising essentially passing the alcohol to be converted, in a practically anhydrous condition, over a dehydrogenation catalyst maintained at a temperature between 200° and 260° C., removing substantially all the ester formed and a part of the aldehyde and the unconverted alcohol by condensation from the gas-vapour product resulting from the reaction, and returning the gaseous remainder rich in hydrogen continuously to the catalyzing zone to join with further fresh alcohol, while continuously bleeding off the excess of hydrogen formed in the reaction, separating said resultant aldehyde and unconverted alcohol in the condensate from the resultant ester, and returning said aldehyde and unconverted alcohol to the catalyzing zone.

6. Process for the conversion of ethyl alcohol into ethyl acetate, comprising essentially passing the alcohol to be converted, in a practically anhydrous condition, over a dehydrogenation catalyst maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol, while continuously bleeding off the excess of hydrogen formed in the reaction, separating said resultant aldehyde and unconverted alcohol in the condensate from the resultant ester, and returning said aldehyde and unconverted alcohol to the catalyzing zone.

7. Process for the conversion of an aliphatic primary alcohol into an ester containing double the number of carbon atoms, comprising essentially passing the alcohol to be converted, in a practically anhydrous condition, over a dehydrogenation catalyst maintained at a temperature between 200° and 260° C., removing substantially all the ester formed and a part of the aldehyde and the unconverted alcohol by condensation from the gas vapour product resulting from the reaction, and returning the gaseous remainder rich in hydrogen continuously to the catalyzing zone to join with further fresh alcohol, while continuously bleeding off the excess of hydrogen formed in the reaction, regulating the rate of admission of the returned gases so as to be great relatively to the fresh alcohol, separating the resultant aldehyde and unconverted alcohol in the condensate from the resultant ester, and returning said aldehyde and unconverted alcohol to the catalyzing zone.

8. Process for the conversion of an aliphatic primary alcohol into an ester containing double the number of carbon atoms, comprising essentially passing the alcohol to be converted, in a practically anhydrous condition, over a catalyst comprising essentially a dehydrogenating reduced metal activated by an oxide of a metal taken from the group consisting of titanium, thorium and uranium maintained at a temperature between 200° and 260° C., removing substantially all the ester formed and a part of the aldehyde and the unconverted alcohol by condensation from the gas-vapour product resulting from the reaction, and returning the gaseous remainder rich in hydrogen continuously to the catalyzing zone to join with further fresh alcohol, while continuously bleeding off the excess of hydrogen formed in the reaction.

9. Process for the conversion of an aliphatic primary alcohol into an ester containing double the number of carbon atoms, comprising essentially passing the alcohol to be converted, in a practically anhydrous condition, over a catalyst comprising essentially a dehydrogenating reduced metal activated by an oxide of a metal taken from the group consisting of titanium, thorium and uranium maintained at a temperature between 200° and 260° C., removing substantially all the ester formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction, and regulating the rate of admission of the returned gases so as to be great relatively to the fresh alcohol.

10. Process for the conversion of ethyl alcohol into ethyl acetate, comprising essentially passing the alcohol in a substantially anhydrous state over a catalyst comprising essentially a dehydrogenating reduced metal activated by an oxide of a metal taken from the group consisting of titanium, thorium and uranium maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol while continuously bleeding off the excess of hydrogen formed in the reaction.

11. Process for the conversion of ethyl alcohol into ethyl acetate, comprising essentially passing the alcohol in a substantially anhydrous state over a catalyst comprising essentially a dehydrogenating reduced metal activated by an oxide of a metal taken from the group consisting of titanium, thorium and uranium maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol and regulating the rate of admission of the returned gases so as to be great relatively to the fresh alcohol while continuously bleeding off the excess of hydrogen formed in the reaction.

12. Process for the conversion of ethyl alcohol into ethyl acetate, comprising essentially passing the alcohol in a substantially anhydrous state over a catalyst comprising essentially a dehydrogenating reduced metal activated by an oxide of a metal taken from the group consisting of titanium, thorium and uranium maintained at a temperature between 200° and 260° C., removing substantially all the ethyl acetate formed and a part of the aldehyde and the unconverted alcohol by condensation from the gas-vapour product resulting from the reaction, and returning the gaseous remainder rich in hydrogen continuously to the catalyzing zone to join with further fresh alcohol, regulating the rate of admission of the returned gases so as to be great relatively to the fresh alcohol while continuously bleeding off the excess of hydrogen formed in the reaction, separating the said resultant aldehyde and unconverted alcohol in the condensate from the resultant ester, and returning said aldehyde and unconverted alcohols to the catalyzing zone.

HENRI MARTIN GUINOT.